(12) United States Patent
Posamentier

(10) Patent No.: US 7,327,257 B2
(45) Date of Patent: Feb. 5, 2008

(54) RFID TAG WITH MODIFIABLE AND REVERSIBLE READ RANGE

(75) Inventor: Joshua Posamentier, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 366 days.

(21) Appl. No.: 11/015,071

(22) Filed: Dec. 17, 2004

(65) Prior Publication Data

US 2006/0145851 A1 Jul. 6, 2006

(51) Int. Cl.
*G08B 13/14* (2006.01)
(52) U.S. Cl. .............. 340/572.1; 340/10.1; 340/10.3; 340/539.1; 340/572.4
(58) Field of Classification Search ............ 340/572.1, 340/572.4, 539.1, 539.21, 539.23, 10.1, 10.3, 340/10.4, 10.6; 342/42, 44
See application file for complete search history.

(56) References Cited

U.S. PATENT DOCUMENTS 3,720,874 A 3/1973 Gorcik et al.
5,500,651 A * 3/1996 Schuermann ............... 342/42
6,486,769 B1 * 11/2002 McLean .................. 340/10.32
6,975,228 B2 * 12/2005 Wrasman et al. ........ 340/572.1

FOREIGN PATENT DOCUMENTS

JP 02065496 3/1990
JP 09298414 11/1997

OTHER PUBLICATIONS

PCT/US2005/045870 International Search Report and Written Opinion Mailed Apr. 27, 2006.

* cited by examiner

*Primary Examiner*—Davetta W. Goins

(57) ABSTRACT

According to some embodiments, read range control update information is received in a radio frequency (RF) signal. The information is used to control a read range of an antenna. The read range of the antenna can be increased or deceased, for example, by changing an impedance of the antenna.

21 Claims, 3 Drawing Sheets

RFID TAG WITH MODIFIABLE AND REVERSIBLE READ RANGE

BACKGROUND

Description of the Related Art

RFID technology is well known. An RFID tag may be an integrated circuit with a tag insert or an inlay including an integrated circuit attached to an antenna. An RFID reader/writer sends out electromagnetic waves to an RFID tag that induces a current in the tag's antenna. The RFID reader/writer may be a fixed device or a portable device. The tag modulates the waves and may send information back to the RFID reader/writer. Additional information about the items the tag is attached to can be stored on the tag. The tag may be passive or active. Passive RFID tags typically have no power source, and rely upon the energy delivered by the interrogation signal to transit a stream of information. Active RFID tags may have a power source such as a direct current (DC) battery. Information may be exchanged between the tag and the RFID reader/writer through either inductive coupling or backscatter. RFID systems may use many different frequencies, but generally the most common are low (around 125 KHz), high (13.56 MHz), ultra-high (850-900 MHz), and microwave (2.45 Ghz).

RFID systems may be utilized to determine the current location of articles of interest, inventory control and tracking, asset tracking and recovery, tracking manufacturing parts, tracking goods in supply chains, payment systems, and the like. An RFID tag may store information that may be used for security, access control, and/or authentication purposes.

In retail situations it is desirable to disable RFID tags, for example after an item has been purchased to protect customer privacy, disable a security mechanism, or enable access to the attached item. A kill command may be used to permanently disable the RFID tag, rendering the RFID tag unusable. Current RFID tag kill commands are usually permanent or near permanent and require difficult fixes to regain usability of the tag.

A technique to disable an RFID tag that is less destructive to the tag is desired.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DESCRIPTION OF THE EMBODIMENT(S)

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, state machine and the like that manipulate and/or transform data represented as physical, such as electronic, quantities into other data similarly represented as physical quantities.

Figure 1:
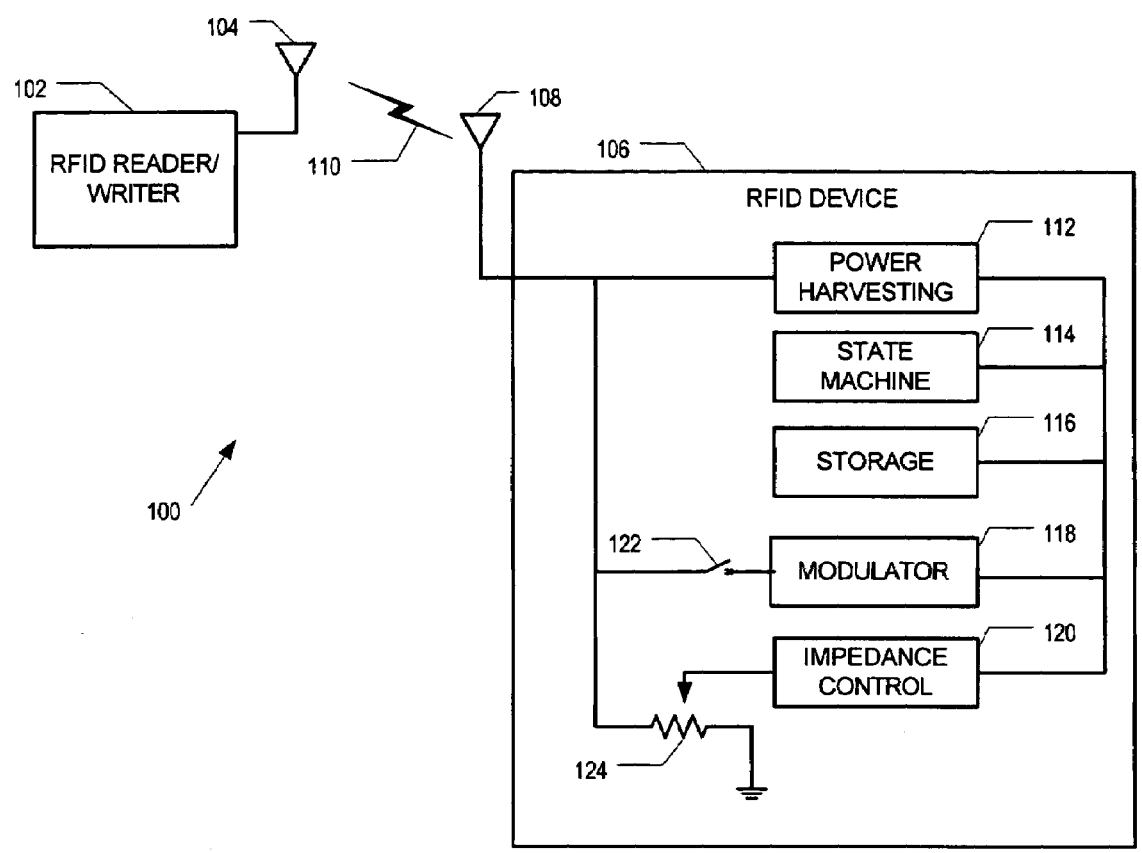
FIG. 1 illustrates an RFID system according to an embodiment of the present invention.

FIG. 1 illustrates an RFID system according to an embodiment of the present invention. System 100 includes a radio frequency identification (RFID) reader/writer 102 having antenna 104 and an RFID device 106 having antenna 108. Any of a number of different low profile antenna types may be used for RFID antenna 104 and RFID antenna 106 including, for example, a dipole, a loop, a patch, and/or others.

RFID device 106 receives and processes an RF signal 110 from RFID reader/writer 102. RFID device 106 may include power harvesting and voltage processing circuitry 112, a processor or state machine 114, storage 116, a modulator 118, and impedance control circuitry 120. Power harvesting and voltage processing circuitry 112 may include protection circuitry such as a diode (not shown) and a voltage regulator (not shown) and an inductor (not shown) to receive RF signal 110 and charge one or more capacitors (not shown) to generate power to operate RFID device 106, although the invention is not limited in this context. Storage 116 may include non-volatile re-writable memory, although the invention is not limited in this context. Storage 116 may also contain a key for decryption, a device identification for signal authentication, and other such information. Modulator 118 controls switch 122 and is used for upstream communications, although the invention is not limited in this context. Impedance control circuitry 120 includes circuitry, for example, an impedance mismatch tap 124, for deliberately and reversibly reducing or increasing the read range of RFID device 106.

To access RFID device 106, an interrogation signal may be transmitted by RFID reader/writer 102 in a vicinity of RFID device 106. Upon receipt of the interrogation signal, RFID device 106 may update impedance control information, for example, RFID device 106 may change the impedance of antenna 108. The antenna may be tuned for whatever impedance is convenient from an antenna design perspective, for example, a 50 ohm impedance match for normal full range communication with a typical minimum return loss of 15 dB. Upon receipt of a read range change command, for example, a soft kill command, impedance control unit 120 may switch an on chip resistor across the antenna port, reducing its impedance to 30 ohms and thus reducing the antenna's return loss to 5 dB. The amount of impedance is set in a non-volatile manner such that the read range remains at a given range until another range command is received. For example, a soft kill command may set bits in a non-volatile memory unit which controls the configuration of the impedance. Note that there are multiple methods of altering the antenna port impedance, the present invention is not limited in this context. The read range of RFID device 106 is reduced by reducing the efficiency of RF power harvesting unit 112 which in turn requires much higher power levels to function. With typical FCC limitations, this has the effect of drastically reducing the read range of RFID device 106.

The impedance control information communicated in signal 110 may be a simple one bit message (short range/long range) or may contain multiple bits to achieve multiple read ranges. By sending different messages, the read range of RFID device 106 may be increased or decreased, for example, from one foot to 15 feet and vice versa.

Thus, unlike full "kill" commands or methods, embodiments of the present invention allow an RFID tag to remain functional, albeit at a close range, and be easily reconfigured for full range operation. This is useful, for example, in a retail environment. After an item is purchased, an attached RFID tag is given a "soft kill" command which reduces the tag's read range to, for example, one foot or less. The consumer is then protected from far-field surveillance of the purchased item. If the item is returned, the read range can be reconfigured and the item returned to stock.

In an alternate embodiment of the present invention, processing of RFID device 106 may include decryption and authentication to protect against malicious access of RFID device 106. Any type of authentication protocol may be used, for example, one-way and two-way protocols. The invention is not limited in this context.

In an alternate embodiment of the present invention, RFID device 106 may send a status or confirmation message back to RFID reader/writer 102.

Figure 2:
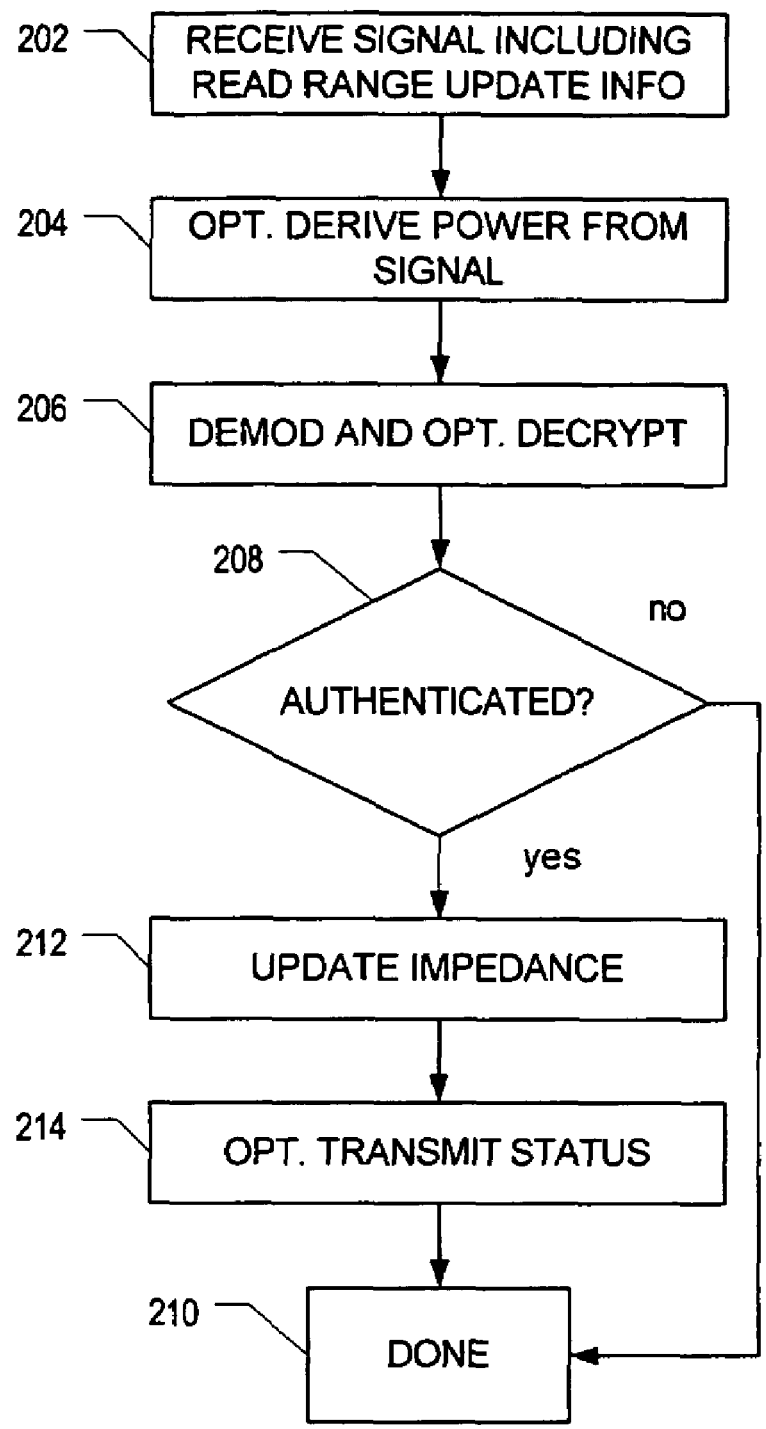
FIG. 2 illustrates a flow diagram for an RFID tag according to an embodiment of the present invention.

FIG. 2 illustrates a flow diagram for an RFID tag according to an embodiment of the present invention. An RF signal is received by an RFID tag, for example, RFID device 106, block 202. The RF signal includes read range update information. In one embodiment of the present invention, power is derived from the RF signal for signal processing, block 204. Alternatively, the RFID tag may include a power source, such as a battery or the like. The signal is demodulated into a digital signal and optionally decrypted, block 206. The signal is optionally authenticated, block 208. If authentication is not achieved, processing discontinues, block 210. If authentication is achieved, read range information is updated according to the read range update information received in the RF signal, block 212. For example, updated read range information may be stored in memory and/or used to control the impedance of antenna 108. By changing the impedance of antenna 108, the read range of RFID device 106 may be changed, for example, increased or decreased. Optionally, a status signal can be sent acknowledging successful update, block 214.

Figure 3:
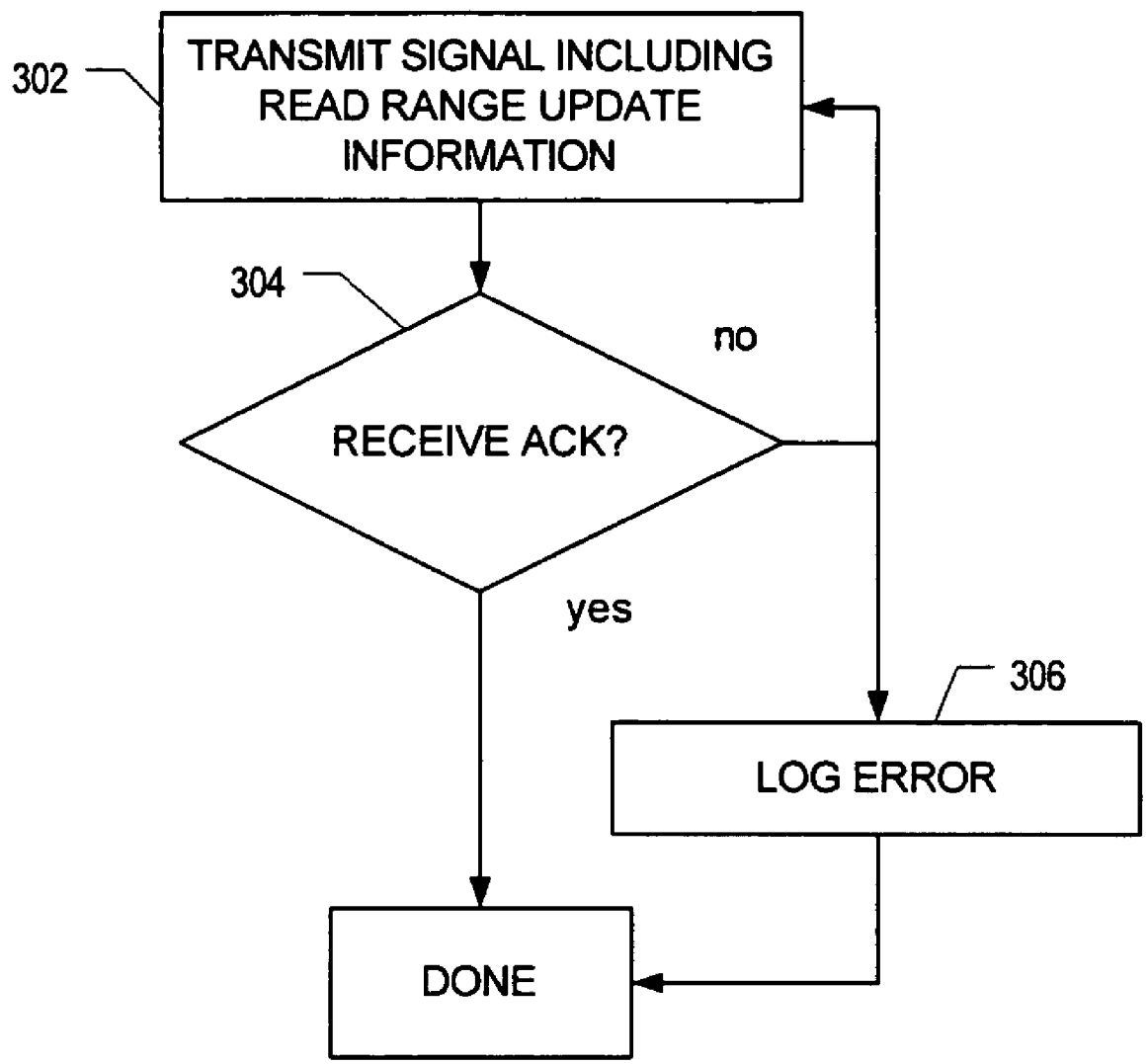
FIG. 3 illustrates a flow diagram for an RFID reader/writer according to an embodiment of the present invention.

FIG. 3 illustrates a flow diagram for an RFID reader/writer according to an embodiment of the present invention. An RFID reader/writer transmits an RF signal to an RFID device, block 302. The RF signal includes read range update information. An antenna of the RFID reader/writer is tuned to an antenna attached to the RFID device. The RFID reader/writer may optionally receive an acknowledgement signal from the RFID device acknowledging a successful update of the device's read range, block 304. If not received, the RFID reader/writer may retransmit the RF signal, block 302 and/or log an error, block 306.

In one embodiment, the RF signal includes enough power such that the RFID device can process the signal, update impedance control information, and optionally send a status message back to the RFID reader/writer. In an alternate embodiment, the RFID device includes its own power source. The RF signal may include device identification, authentication information and may be encrypted.

Although discussed above with reference to RFID like systems, other types of wireless communication systems are intended to be within the scope of the present invention including, although not limited to, Wireless Local Area Network (WLAN), Wireless Wide Area Network (WWAN), Worldwide Interoperability for Microwave Access (WiMax), Wireless Personal Area Network (WPAN), Wireless Metropolitan Area Network (WMAN), Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, Universal Mobile Telecommunications System (UMTS), and the like, although the scope of the invention is not limited in this respect. In at least one implementation, for example, a wireless link is implemented in accordance with the Bluetooth short range wireless protocol (Specification of the Bluetooth System, Version 1.2, Bluetooth SIG, Inc., November 2003, and related specifications and protocols). Other possible wireless networking standards include, for example: IEEE 802.11 (ANSI/IEEE Std 802.11-1999 Edition and related standards), IEEE 802.16 (ANSI/IEEE Std 802.16-2002, IEEE Std 802.16a, March, 2003 and related standards), HIPERLAN 1,2 and related standards developed by the European Telecommunications Standards Institute (ETSI) Broadband Radio Access Networks (BRAN), HomeRF (HomeRF Specification, Revision 2.01, The HomeRF Technical Committee, July, 2002 and related specifications), and/or others.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A system comprising
   a radio frequency identification (RFID) device and an antenna coupled to the RFID device, the RFID device comprising:
   a read range control circuitry coupled to the antenna;
   the read range control circuitry to modify a read range of the antenna between a first read range and a second read range;

wherein the RFID device is to obtain its operating power from a radio frequency signal received through the antenna.

2. The system as recited in claim 1, the read range control circuitry to modify the read range of the antenna according to a radio frequency (RF) signal received on the antenna.

3. The system as recited in claim 1, the read range control circuitry comprising an impedance control unit to modify the read range of the antenna between the first read range and the second read range.

4. The system as recited in claim 3, the impedance control unit comprising an impedance mismatch tap.

5. The system as recited in claim 1, the read range control circuitry wherein the first read range is greater than the second read range.

6. The system as recited in claim 1, the read range control circuitry to modify the read range between three or more read range distances.

7. The system as recited in claim 1, further comprising non-volatile memory to store read range information received on the antenna.

8. The system as recited in claim 1, further comprising power harvesting circuitry coupled to the antenna to harvest power from a radio frequency (RF) signal containing read range update information.

9. The system as recited in claim 1, further comprising a modulating switch coupled to the antenna to send a read range update acknowledgement message on the antenna.

10. A method comprising:
receiving, through an antenna of a radio frequency identification (RFID) device, a radio frequency (RF) signal that provides operating power for the RFID device, the RF signal containing read range update information; and
updating a read range capability of the antenna according to the read range update information;
wherein the read range update information specifies one of two or more pre-specified read ranges.

11. The method as recited in claim 10, wherein the two or more pre-specified read ranges comprise a short read range and a long read range.

12. The method as recited in claim 10, wherein updating the read range capability comprises modifying an impedance of the antenna.

13. The method as recited in claim 10, further comprising storing the read range update information in non-volatile memory.

14. The method as recited in claim 10, further comprising authenticating the RF signal.

15. The method as recited in claim 10, further comprising decrypting the RF signal.

16. The method as recited in claim 10, further comprising sending a read range update acknowledgement message through the antenna.

17. A method comprising:
sending a radio frequency (RF) signal containing read range update information to a radio frequency identification device that receives its operating power from the RF signal;
wherein the read range update information specifies one of two or more pre-specified read ranges.

18. The method as recited in claim 17, wherein the two or more pre-specified read ranges comprise a short read range and a long read range.

19. The method as recited in claim 17, wherein the RF signal further contains an authentication.

20. The method as recited in claim 17, wherein the RF signal is encrypted.

21. The method as recited in claim 10, further comprising receiving a read range update acknowledgement message.

* * * * *